United States Patent [19]

Goldstein

[11] Patent Number: 4,698,746
[45] Date of Patent: Oct. 6, 1987

[54] MULTIPROCESSOR COMMUNICATION METHOD AND APPARATUS

[75] Inventor: Arthur Goldstein, Aromas, Calif.

[73] Assignee: Ramtek Corporation, Santa Clara, Calif.

[21] Appl. No.: 498,024

[22] Filed: May 25, 1983

[51] Int. Cl.[4] ............................................. G06F 13/42
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,541,517 | 11/1970 | Belt | 364/200 |
| 3,551,892 | 12/1970 | Driscoll | 364/200 |
| 3,639,912 | 2/1972 | Campbell | 364/200 |
| 3,771,137 | 11/1973 | Barner | 364/200 |
| 3,778,780 | 12/1973 | Moore | 364/200 |
| 3,820,079 | 6/1974 | Bergh | 364/200 |
| 3,833,889 | 9/1974 | Cray | 364/200 |
| 4,016,548 | 4/1977 | Law | 364/200 |
| 4,075,691 | 2/1978 | Davis | 364/200 |
| 4,320,452 | 3/1982 | Kempf | 364/200 |
| 4,325,147 | 4/1982 | Rothlauf | 364/200 |
| 4,354,262 | 10/1982 | Guezou | 364/200 |
| 4,355,354 | 10/1982 | Kempf | 364/200 |
| 4,402,046 | 8/1983 | Cox | 364/200 |

Primary Examiner—David Y. Eng
Attorney, Agent, or Firm—Limbach, Limbach & Sutton

[57] ABSTRACT

A method and apparatus for synchronizing communication between a plurality of processors which communicate with one another over a system bus wherein sending processors seek to transfer information to target processors. Means are provided for each processor to store information to be transferred, for receiving a request signal from a sending processor, and for receiving an acknowledgment signal from a target processor, wherein the sending processor provides a request signal to the target processor, with the target processor thereafter accessing the contents of the storing means of the sending processor. Upon completion of retrieval by the target processor of information from the storing means, the target processor writes an acknowledgment signal into the means for receiving an acknowledgment signal associated with the sending processor. The present invention thus permits efficient data transfer between a plurality of processors while permitting each processor to retrieve data which is sought to be transferred to it, at a point in time which is selected by the target processor.

5 Claims, 6 Drawing Figures

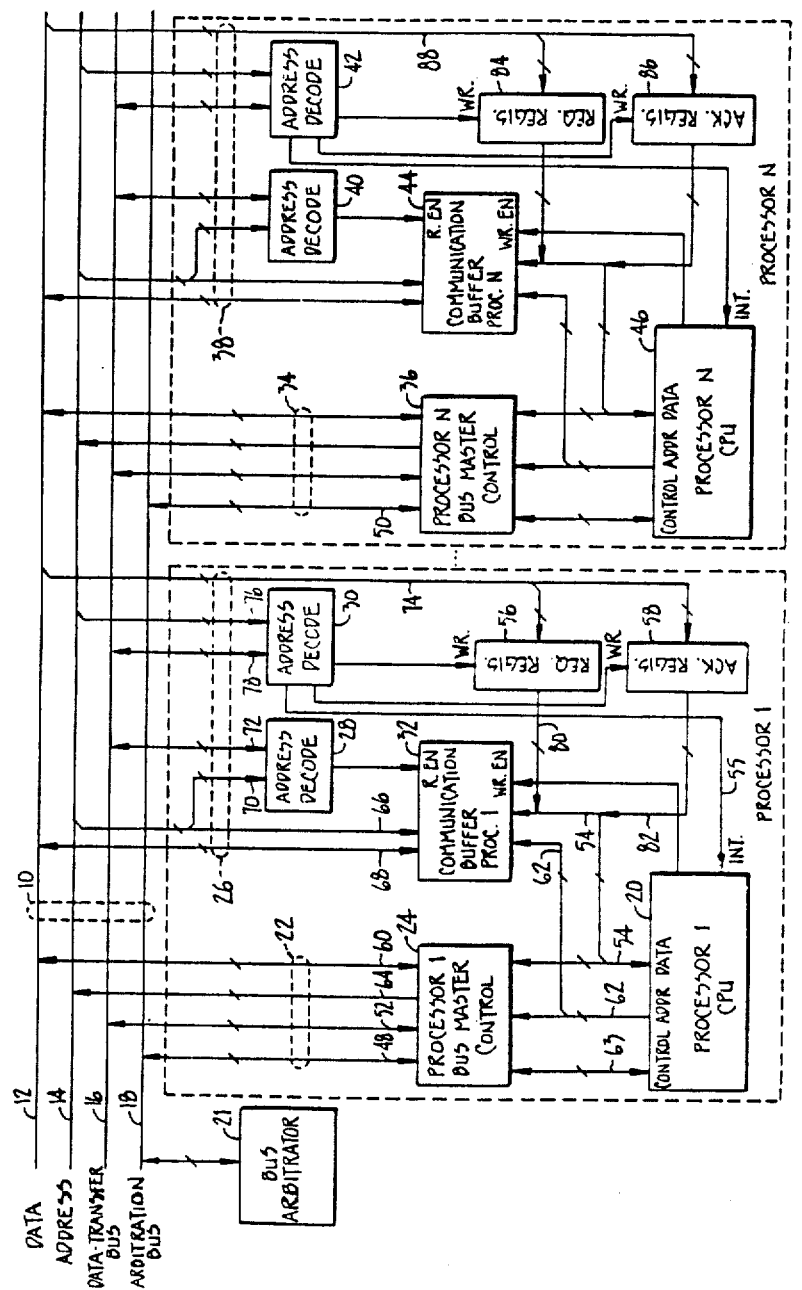
FIG._1.

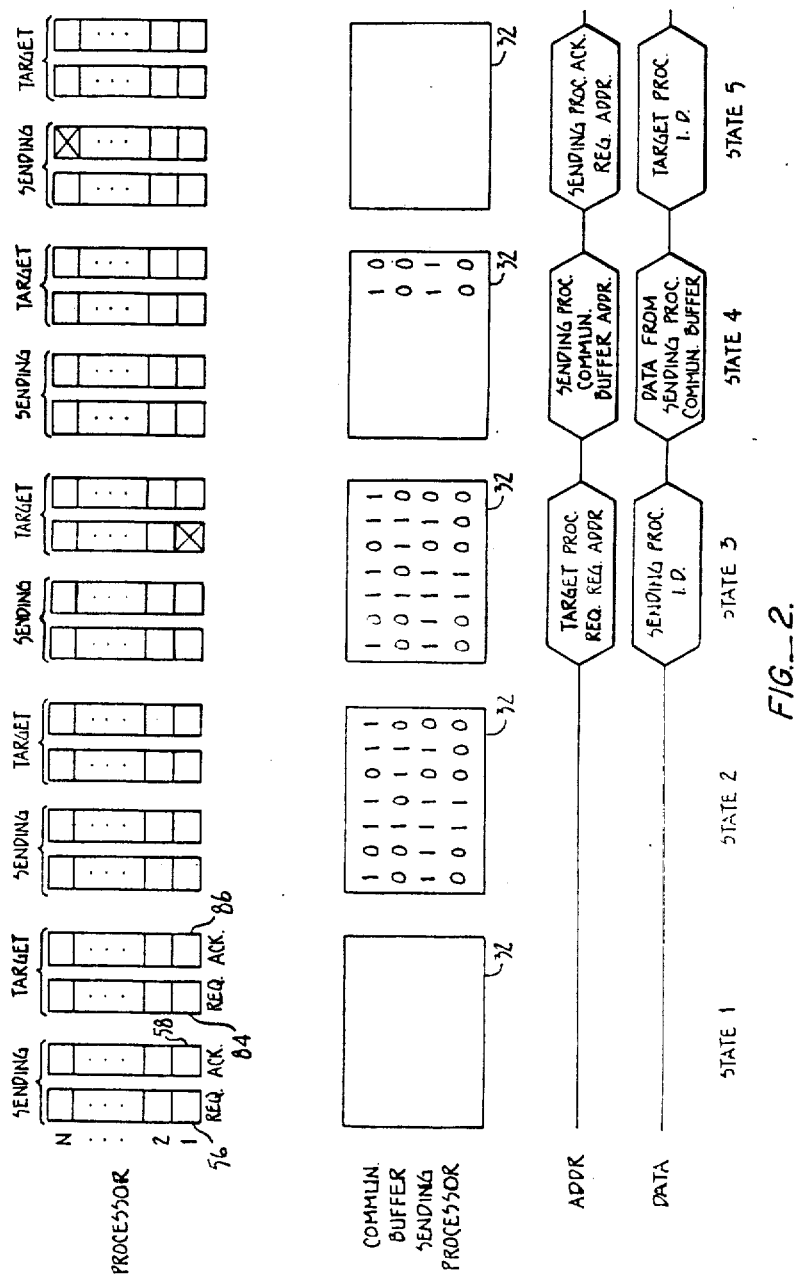
FIG._2.

| 23 22 21 20 | 19 18 17 16 | 15 14 13 12 | 11 10 9 8 | 7 6 5 4 | 3 2 1 0 | ADDRESS BITS |
|---|---|---|---|---|---|---|
| 0 0 0 0 | PROCESSOR ID-WHERE BUFFER IS LOCATED | 0 X X X | X X X X | X X X X | X X 0 0 | COMMUNICATION BUFFER ADDRESSING |
| 0 0 0 0 | PROCESSOR ID-TARGET | 1 X X X | X X X X | X X X X | 0 0 0 0 | REQUEST REGISTER ADDRESSING |
| 0 0 0 0 | PROCESSOR ID-SENDING | 1 X X X | X X X X | X X X X | 0 1 0 0 | ACKNOWLEDGE REGISTER ADDRESSING |
| 0 0 0 0 | X X X X | X X X X | X X X X | X X X X | X X X X | LOCAL ADDRESSING |
| SELECTED ACCORDING TO DEVICE BEING ADDRESSED | X X X X | X X X X | X X X X | X X X X | X X X X | SYSTEM ADDRESSING |

X = DON'T CARE

| PROC. I.D. | PROCESSOR # (FOR EXAMPLE) |
|---|---|
| 0 0 0 | 0 |
| 0 0 1 | 1 |
| 0 1 0 | 2 |
| 0 1 1 | 3 |
| 1 0 0 | 4 |
| 1 0 1 | 5 |
| 1 1 0 | 6 |
| 1 1 1 | 7 |

FIG._3.

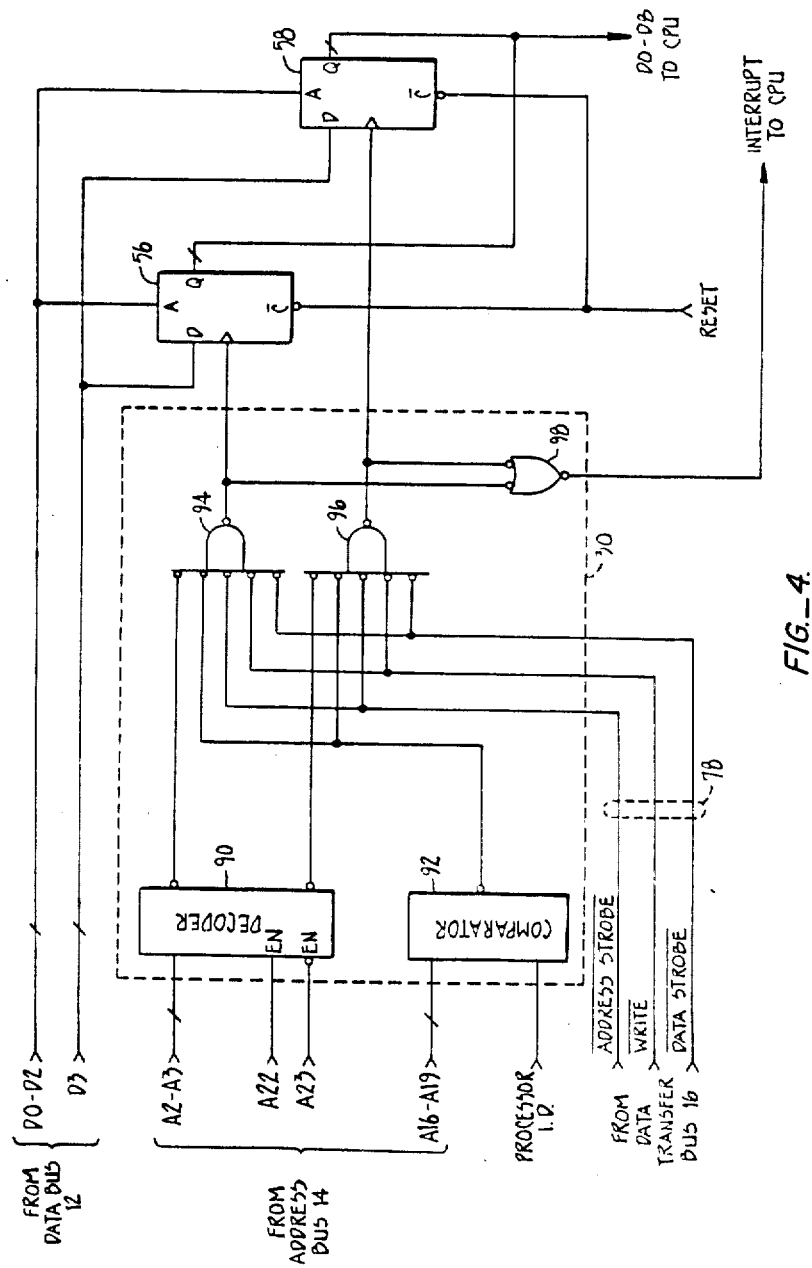
FIG.—4.

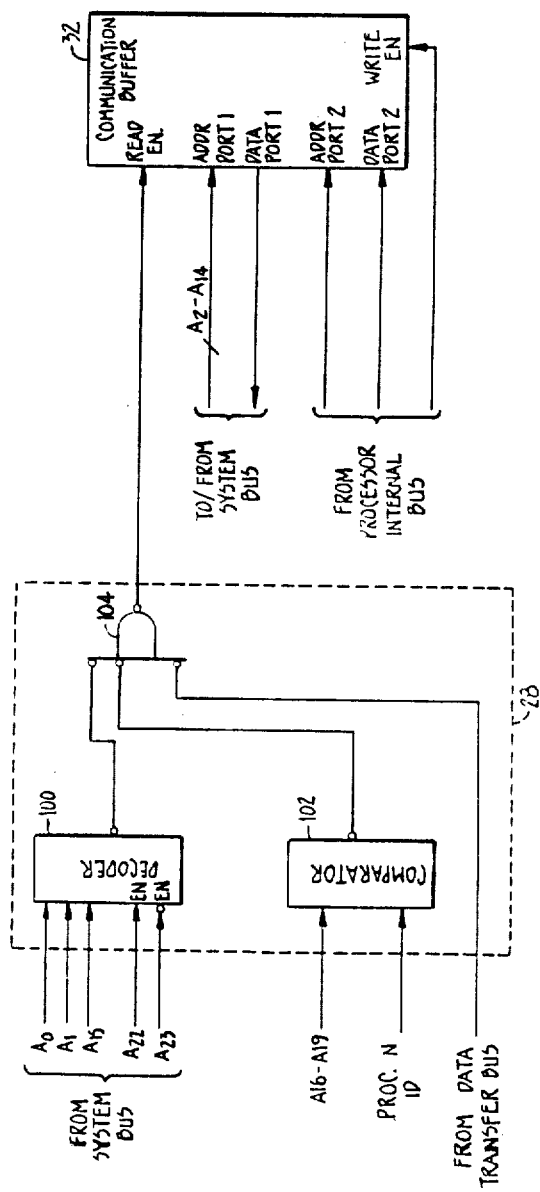

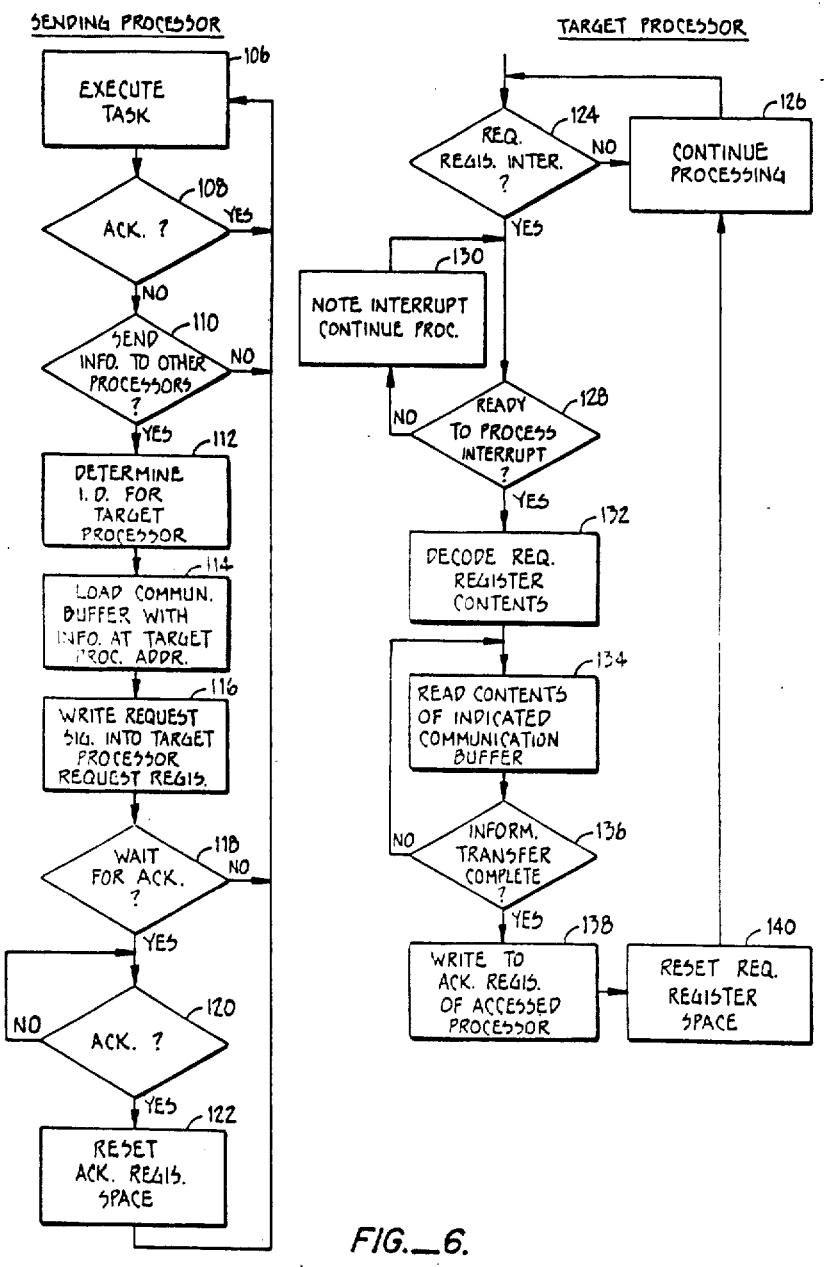
FIG._6.

4,698,746

MULTIPROCESSOR COMMUNICATION METHOD AND APPARATUS

DESCRIPTION

TECHNICAL FIELD

The present invention is directed in general to control of a plurality of processors which communicate with one another in a multiprocessor system and, more particularly, to a method and apparatus for controlling the communication between these processors over a system bus.

BACKGROUND OF THE INVENTION

In the past, when several independent processors shared a system bus, the efficiency by which information could be transferred by a sending processor to a target processor was determined by the availability of the target processor at the time the sending processor sought to send the information. If the target processor were made to be responsive to an interrupt signal from a sending processor, such that the target processor would be required to halt its current processing to receive the information from the sending processor, the efficiency of the target processor would also be reduced.

Frequently, in existing systems, a status register is used which is associated with each processor and which indicates to any sending processors whether the particular target processor is free to receive information. A sending processor would thus poll the status register to determine whether it can send information thereto. There are three fundamental deficiencies with this technique, however. The first is that, between the time a processor finds a target processor ready and the time it actually sends a message or data, still another processor might start communicating with the target processor, because it too found the target processor free and was able to start sending its messages ahead of the first processor. The consequence of this is a collision resulting in garbled data to the target processor. The garbled data is caused by receipt by the target processor of messages from two different processors in a disorderly fashion. A second deficiency is that the requirement that a status register be polled before information can be transmitted reduces the communication bandwidth between processors. This is because in order to communicate, a request for status and a return of status cycle would be required for each communication.

A third deficiency is that, during the status register polling process, the sending processor is not able to procede with processing of other tasks. Therefore, time spent in polling a status register is essentially wasted time which results in a net loss of system processing power.

SUMMARY OF THE INVENTION

The foregoing and other problems of prior art multiprocessor communication control apparatus and methods are overcome by the present invention of an apparatus for controlling communication between sending processors and receiving processors over a system bus, comprising a plurality of storage means, each of which is connected to a different processor and to the system bus for receiving request and acknowledgment signals from the system bus, wherein the request signals are supplied by a sending processor to the register associated with the target processor, and wherein the acknowledgement signals are supplied from a target processor to the register associated with the sending processor from which the target processor has successfully retrieved information. Also included are a plurality of communication buffer means, each of which is coupled to a different sending processor and to the system bus for storing the information which is to be sent, whereby said information is available for retrieval by a target processor over the system bus. The target processor retrieves the information in response to a request signal placed in the storage means associated with the target processor by the sending processor. The target processor, after retrieving the information from the communication buffer means associated with the sending processor, places an acknowledgment signal in the storage means associated with the sending processor to indicate thereto that a successful retrieval of information has occurred.

With such a configuration, a sending processor need only perform a single access cycle over the system bus to the target process. Thereafter, the sending processor can continue processing its current task independently of the state of the target processor. The sending processor can write into its associated communication buffer means independently of activity on the system bus or in the target processor. The sending processor will know by simply accessing the storage means whether the transfer of information to the target processor has yet been completed.

With respect to the target processor, receipt of information from a sending processor can be controlled according to the processing requirements of the target processor. Preferably, whenever a sending processor writes into a storage means associated with a target processor, said storage means supplies a flag to the target processor which indicates to the target processor that a sending processor seeks to transfer data to it. Thereafter, the target processor, at its convenience, can access its storage means, and retrieve the request signal therefrom. Preferably, the request signal uniquely identifies the sending processor which wrote the signal into the storage means. Based upon this information, the target processor can address the communication buffer means of the sending processor to retrieve the information therefrom.

Once the information transfer is completed, the target processor then writes the acknowledgment signal, in the form of its own identification number, into the storage means of the sending processor. As such, the sending processor need not wait for a successful exchange of information to occur before continuing its current processing. Only a periodic check of the storage means, or an interrupt upon a write into the storage means, would be needed to keep the sending processor informed about the status of information transfer.

It is, therefore, an object of the present invention to provide a method and apparatus for controlling communication between a plurality of processors over a system bus wherein a sending processor can write information into a temporary storage buffer, inform the target processor that information is sought to be transferred, and thereafter continue processing its current task independently of the target processor activity.

It is another object of the present invention to provide a method and apparatus for controlling communication between a plurality of processors over a system bus wherein a target processor can receive an indication that a sending processor seeks to transfer information to it, and thereafter, at its convenience, retrieve the identity of the sending processor, access the buffer means associated with the sending processor wherein the information sought to be transferred is stored, and retrieve the information, and thereafter indicate to the sending processor that successful transfer of information has occurred.

It is still another object of the present invention to provide a method and apparatus for controlling communication between a plurality of processors over a system bus which minimizes collision between processors when accessing a third processor.

It is still another object of the present invention to provide a method and apparatus for controlling communication between a plurality of processors over a system bus which maximizes the computing power of said system.

It is a further object of the present invention to provide a method and apparatus for controlling communication between a plurality of processors over a system bus including a plurality of storage means each associated with a different processor and connected to the system bus, and a plurality of information storage means each associated with a different processor and connected to the system but, wherein the storage means receives and storage request and acknowledge signals, wherein said request signals are supplied by sending processors seeking to transfer information to the target processor associated with the storage means being written into, and wherein the acknowledgment signals are provided to the storage means from target processors which have successfully completed transfer of information from the sending processor with which the storage means are associated, and whereby the sending processor can write the information to be transferred into the storage buffer for later access by a target processor.

These and other objectives, features, and advantages of the present invention will be more readily understood upon consideration of the following detailed description of the invention and accompanying drawings.

BRIEF DESCRIPTION OF THE DRAWINGS

FIG. 1 is a functional block diagram illustrating the interconnection of the multiple processors over the system bus and the interconnection of the storage means and information storage means.

FIG. 2 is a timing diagram illustrating the sequence of events which occur in the transfer of information according to the present invention.

FIG. 3 illustrates an addressing scheme by which the present invention can be implemented.

FIG. 4 is a schematic diagram of the request and acknowledgment registers along with address decoding circuity.

FIG. 5 is a simplified schematic of the communication buffer and associated addressing circuitry.

FIG. 6 provides flow diagrams which illustrate the method of the present invention.

DETAILED DESCRIPTION OF THE INVENTION

Referring to FIG. 1, the general structure of the present invention will now be described in greater detail. System bus 10 includes a data bus 12, an address bus 14, a data transfer bus 16, and an arbitration bus 18. Communication between processors is conducted by way of the data bus 12, the address bus 14, and the data transfer bus 16 of the system bus 10. The arbitration bus 18 handles signals between the processors and a bus arbitrator module 20. The bus arbitrator module 20 regulates processor activity on the bus and arbitrates processor priority to the bus. It is to be understood that, for satisfactory operation of the present invention, a bus arbitrator module is not required and that the present invention is equally applicable to systems having the standard data, address and control buses.

FIG. 1 illustrates the connection of a processor 1 and a processor N to the system bus 10, it being understood that a multiplicity of processors are envisioned to be connected to the system bus 10 in the present invention. Processor 1 is shown to be interfaced to system bus 10 through a set of lines 22 associated with bus master control circuitry 24 for processor 1, and by a set of lines 26 associated with address decoder circuits 28 and 30 and communication buffer 32. Similarly, processor N is interfaced to the system bus 10 via a set of lines 34 associated with the bus master control circuitry 36 for processor N, and a set of lines 38 associated with address decoder circuits 40 and 42, and communication buffer 44.

As mentioned above, the system in FIG. 1 utilizes a bus arbitrator module 20 to determine which processor is to have control over the system bus 10. Bus master control circuits 24 and 36 receive control signals from central processing units 20 and 46, respectively, and in response thereto, communicate over arbitrator bus 18 with bus arbitrator 20. With respect to the set of lines 22, line 48 couples bus master control circuitry 24 to arbitrator bus 18. With respect to the set of lines 34, line 50 couples bus master control circuitry 36 with arbitrator bus 18. It is to be understood that these lines are multiple conductor buses suitable for carrying binary signals. This is indicated in the figures by a slash across each such line.

When bus arbitrator 21 assigns control of the system bus 10 to a particular processor, such as processor 1, the associated bus master control circuit, in this case, bus master control circuitry 24, provides data transfer control signals to data transfer bus 16. As can be seen from FIG. 1, bus master control circuitry 24 transfers these signals over line 52. All of the processors on the system bus 10 are responsive to the signals on data transfer bus 16 supplied by a bus master.

When a processor becomes a bus master, its associated bus master control circuit, e.g., bus master control circuit 24 for processor 1, enables address and data bus connections between the system bus 10 and the central processing unit, e.g., CPU 20. With respect to processor 1, internal data bus 54 couples processor 1 to bus master control circuitry 24, communication buffer 32, request register 56 and acknowledgment register 58. Bus master control circuitry 24, in turn, couples internal data bus 54 to data bus 12 via line 60, whenever processor 1 is the bus master. Similarly, internal address bus 62 is coupled to bus master control circuitry 24, which, in turn, connects the internal bus 62 to the address bus 14, via line 64, when processor 1 is the bus master. Internal address bus 62 is also connected to communication buffer 32.

It is to be understood that, in addition to the connections of internal data bus 54, address bus 62 and control bus 63, as shown in FIG. 1, these buses will also connect to an internal memory, interface circuitry, and other similar circuits associated with the functions performed by the particular processor. The additional circuitries are not shown in order to simplify the explanation of the present invention.

During the period of time when a particular processor, such as processor 1, is not a bus master, its CPU will typically be performing processor-related, versus system-related, tasks. These tasks include accessing the communication buffer, the request register and the acknowledgment register in connection with responding to or initiating data transfer with another processor.

In accordance with the present invention, information transfer between processors can occur even when the processor sending the information is performing other tasks. To do this, the present invention utilizes a communication buffer, a request register, an acknowledgment register, and address decoding circuitry.

The present invention will now be explained in terms of a transfer of information between processor 1 and processor N, shown in FIG. 1. As can be seen from FIG. 1, address decode circuitries 28 and 30, communication buffer 32, request register 56, and acknowledgment register 58 form a data path between the system bus 10 and central processing unit 20 which is independent of the data path controlled by bus master circuitry 24. Communication buffer 32 receives addresses from address bus 14 via line 66 and supplies data to data bus 12 in response thereto, via line 68. Address decoder 28 monitors the addresses on address bus 14 via line 70, and enables communication buffer 32 for a read operation whenever the appropriate address is present on address bus 14. Address decoder 28 also receives control signals on data transfer bus 16 via line 72. These control signals indicate to address decorder 28 the nature of the operation sought to be performed in connection with the data and addresses present on data bus 12 and address bus 14, respectively.

Request register 56 and acknowledgment register 58 receive information from data bus 12 via line 74. Address decoder circuitry 30 monitors the addresses on address bus 14 via line 76 and supplies appropriate write enable signals to request register 56 and acknowledgment register 58 when the appropriate addresses are present on address bus 14. Address decoder 30 also communicates with data transfer bus 16 via line 78. Finally, address decoder circuitry 30 supplies an interrupt signal to CPU 20 whenever it supplies a write enable signal to either request register 56 or acknowledgment register 58.

CPU 20 is indirectly coupled to the data path provided by the set of lines 26, via internal address bus 62, internal data bus 54, and through communication buffer 32. As described previously, communication buffer 32 receives addresses and data from these internal buses. Additionally the outputs of request register 56 and acknowledgment register 58 are coupled to internal data bus 54 via lines 80 and 82, respectively. Furthermore, CPU 20 supplies a write enable signal to communication buffer 32.

With the above interconnections, CPU 20 can write information into communication buffer 32 and monitor the states of request register 56 and acknowledgment register 58. It is to be understood that each of the processors in the system has a similar dual data path structure. Such a structure enables one processor, hereinafter referred to as a sending processor, to signal another processor, hereinafter referred to as a target processor, that the sending processor seeks to transfer information to the target processor. Additionally, the structure of the present invention permits the identity of the sending processor to be written into circuitry associated with the target processor. Thereafter, the target processor is free at its convenience to retrieve the sending processor identitiy information and, thereafter, again at its convenience, access the communication buffer of the sending processor to retrieve the information that is sought to be transferred.

Referring to FIG. 2, the manner and order in which the above-described information transfer occurs will be explained in greater detail. Assume, for purposes of explanation, that processor 1 is the sending processor, and that processor N is the target processor. The upper portion of FIG. 2 depicts the contents of the request and acknowledgment registers for the sending processor and the target processor. Below that portion, the contents of the communication buffer of the sending processor is depicted. Finally, the information supplied on the address bus 14 and data bus 12 is illustrated.

State 1 illustrates the system when the data transfer circuitry are at rest. Thus, the communication buffer is empty, as are the request and acknowledgment registers for the sending and target processors. In state 2, the sending processor has filled its communication buffer with the information to be transferred. Preferably, communication buffer 32 will be a dual port buffer so that CPU 20 can write into the buffer using address, data and enable lines which are independent of the lines by which the other processors in the system access it via system bus 10. Thus, for example, CPU 20 will supply a write enable signal to communication buffer 32, along with addresses and the data to be written therein, via lines 55, 62 and 54 respectively. This occurs in state 2 in FIG. 2. Once the CPU 20 has completed writing into communication buffer 32, it requests control of the system bus 10 from bus arbitrator 20. Assuming CPU 20 obtains control of the bus, it provides on address bus 14 the address of the target processor request register, in this case request register 84 of target processor N. Simultaneously, on the data bus 12, CPU 20 provides an identification code by which it identifies itself to the target processor, in this case processor N.

When the addres of the target processor request register appears on address bus 14, address decoder 42 recognizes that its associated request register is being addressed. In response to this address, the address decoder supplies a write enable signal to request register 84, and simultaneously provides an interrupt signal to CPU 46. In response to the write enable signal, request register 84 stores the data present on data bus 12 via line 88. At this point, as shown in state 3 of FIG. 2, the request register 84 of target processor N, now contains therein an indication that processor 1 is seeking to transfer information.

In response to the interrupt signal from address decorder 42, CPU 46 examines the output states of the request register 84 to determine the identity of the sending processor. It is to be noted that CPU 46 need not immediately respond to the sending procesor's request. Because the identity of the sending processor is maintained in request register 84, the CPU 46 can continue processing its current task. Thereafter, when an appropriate point in its processing occurs, CPU 46 can then examine the outputs of request register 84 to obtain the sending processor identity.

When CPU 46 decides that it is ready to retrieve the information from the sending processor, it determines the sending processor identity from request register 84. Thereafter, it will request control of the system bus 10 via bus master control circuitry 36. Preferably, the addresses supplied will include the identity code of the sending processor, as well as the particular locations within the communication buffer 32 at which the information sought to be transferred resides.

When address decoder 28 senses the presence of the address, on address bus 14, for communication buffer 32, it will send a read enable single to communication buffer 32. Upon receipt of this read enable signal, communication buffer 32 will become responsive to addresses present on line 66, and thus responsive to addresses on address bus 14. Concurrently, communication buffer 32 supplies data, via line 68, to data bus 12 corresponding to the addresses on address bus 14. This continues until the appropriate information is read out of communication buffer 32. This is shown in state 4 of FIG. 2.

When all of the appropriate information has been retrieved by the target processor N, CPU 46 provides the address for the acknowledgment register of the sending processor, i.e., processor 1, on the address bus 14. Concurrently, CPU 46 supplies its identification code on data bus 12. Address decoder 30 recognizes the presence of the address for acknowledgment register 58, and in response thereto supplies a write enable signal to acknowledgment register 58. In response to this enable signal, acknowledgment register 58 stores the data present on data bus 12. Thus, acknowledgment register 58 now contains the identity of the target processor, thus indicating that a successful transfer information has occurred. Simultaneously, with its supplying of a write enable signal to acknowledgment register 58, address decoder 30 will also supply an interrupt signal to CPU 20 to indicate that data transfer activity has occurred. Upon receipt of this interrupt signal, CPU 20 can, at its convenience, access its request register 58 and acknowledgment register 58 to determine the nature of such activity. In doing so, CPU 20 will find that processor N has successfully retrieved information from the communication buffer 32. The above is shown in state 5 of FIG. 2.

Referring to FIG. 3, one format for addressing the various registers and buffers is illustrated. As can be seen from FIG. 3, the address bus 12 is 24 bits wide. It is to be understood that the number of address bits actually required is a function of the amount of addressing which must be done. Thus, the 24 bits shown in FIG. 3 are intended only to illustrate a possible format for addressing in the present invention. The addressing format shown includes addressing for the communication buffers, the request registers, the acknowledgment registers, for local addressing and for system addressing. It is to be noted that bits 20 through 23 determine whether the address is a data transfer address, i.e. addressing to a communication buffer, a request register, an acknowledgment register, a local address or a system address. Address bits 0 through 3 and 15 are data transfer bits which indicate whether the address is for a communication buffer, for a request register, or for an acknowledgment register. With respect to these types of addreses, bits 16 through 19 are reserved for the processor ID code which identifies to whom or from whom the data access is made.

Thus, it can be seen that for a communication buffer address, the processor ID which is supplied in bits 16 through 19 is the address for the processor where the buffer sought to be accessed is located. With respect to the request register addressing, the processor ID supplied is that of a target register. With respect to the acknowledgment register addressing, the processor ID supplied is that of the sending processor.

Typical codes for the processor ID are shown at the bottom left of FIG. 3. Thus, in FIG. 2, state 3, the processor ID supplied on the address bus 14 will take the form of the binary number which represents the number N. Similarly, in state 4, the sending processor ID supplied on address bus 14 will take the form of 000 followed by a 1 bits 16 through 19, respectively.

Referring to FIG. 4, an illustrative schematic for the address decoder circuitry and request and acknowledgment register will now be described in conjunction with FIG. 3. The decoder circuitry 30 includes a decorder 90, which receives address bits 2, 3, 22 and 23; comparator circuit 92; inverter input NAND gates 94 and 96; and inverter input NOR gate 98. Comparator 92 receives address bits 16 through 19 from address bus 14. As can be seen from FIG. 3, address bits 16 through 19 contain a processor identity. Comparator 92 compares this information against its processor ID. This is received on its other set of inputs. When there is a match, comparator 92 provides an appropriate signal to gate 94 and gate 96, thus, indicating that the information on address bus 14 and data bus 12 is intended for its associated processor.

As mentioned above, decoder 90 receives address bits 2 and 3 from address bus 14. From FIG. 3, it can be seen that address bits 2 and 3 indicate whether the request register or the acknowledgment register is sought to be accessed. If the request register is sought to be accessed, decoder 90 supplies the appropriate signal to gate 94 which, assuming that the signals coming from data transfer bus 16 in line 78 are in the appropriate condition, will cause a write enable signal to be supplied to request register 56. If, on the other hand, address bits 2 and 3 indicate that the acknowledgment register is sought to be accessed, decoder 90 will supply the appropriate signal to gate 96, which, in turn, will cause the write enable signal to be supplied to acknowledgment register 58.

In FIG. 4, the output of gate 94 is shown connected to request register 56, while the output of gate 96 is shown connected to acknowledgment register 58. Both of these outputs are also shown connected to the inputs of inverted input NOR gate 98. Gate 98 supplies the interrupt signal to the associated process whenever a write enable signal is supplied from gate 94 or gate 96.

In the preferred embodiment of the present invention, the request register 56 and acknowledgment register 58 in FIG. 4 takes the form of addressable latches. Such latches are identified by industry number 74LS259, and are manufactured by the Signetics Corporation of Sunnyvale, California. As can be seen from the figure, the address inputs of these latches are connected to bits 0 through 2 of data bus 12, while the D input is connected to bits 3 of data bus 12. These addressable latches have a plurality of individual cells, each of which is independently addressable according to addresses supplied at address inputs A. The state which is assumed by an address cell is determined by the data supplied at the data inputs D. In the preferred embodiment of the present invention, each cell of the addressable latch is assigned to a particular processor. The identity of the sending processor or target processor can thereafter be indicated by simply setting the appropriate cell in the addressable latches.

It can also be seen that a processor can reset its own request register and acknowledgment contents by supplying the appropriate addresses and data on the address bus 14 and data bus 12 via the bus master control circuitry.

Referring to FIG. 5, the decoding circuitry and associated communication buffer according to one embodiment of the present invention is illustrated. As can be seen from FIG. 5, decoder circuit 100 receives bits 0, 1, 15, 22 and 23 from address bus 14. From FIG. 3, it can be seen that address bit 15 indicates whether or not a communication buffer access is sought. As before, address bits 0 and 1 are required to have a logic zero state for access to the communication buffer. Comparator 102 receives the processor ID address bits, A16 through A19, from address bus 14 and compares it to its processor ID. The decoder circuit 100 output, the comparator circuit 102 output, and the signals from the data transfer bus are supplied to an inverted input NAND gate 104. When the appropriate address and signals are present, NAND gate 104 supplies a read enable signal to communication buffer 32. This, in turn, permits communication buffer 32 to receive address bits A2 through A14 from address bus 14 and to supply data to data bus 12.

Referring to FIG. 6, a flow diagram illustrating the interaction of the various elements of the present invention will now be described. Information transfer typically begins with the sending processor, in step 106, in which the processor is executing a task. At some point of the task, the processor may examine its acknowledgment register to determine whether a previous information transfer has been completed, step 108. If yes, the processor returns to step 106. If an acknowledgment has not been received, the processor may proceed to step 110 in which it decides whether it wants to send information to other processors.

If not, it returns to step 106 and continues processing. If, on the other hand, information is sought to be transferred, step 112 is processed. In step 112, the processor determines the ID code for the target processor. Thereafter, the processor proceeds to step 114 wherein it loads its communication buffer with the information to be transferred. In one embodiment of the present invention, specific locations in each of the communication buffers are reserved for each of the other processors in the system. Thus, when a processor accesses another processor's communication buffer, it can address the location assigned to it. In a further embodiment of the present invention, a portion of each communication buffer is allocated as a message/pointer section. When a target processor accesses the communication buffer of another processor, it accesses its assigned location in the message/pointer section thereof. The message/pointer section can contain short messages, or instructions which direct the target processor to another portion of the communication buffer. For longer messages, the section can contain pointers to locations in another memory structure. The instructions can also identify the type of information which will be found at the pointed-to location. In this manner, more efficient use of the communication buffer space can be made. Thus, in step 114, the sending processor will load its communication buffer with information at the location assigned to the target processor.

In step 116, the sending processor writes a request indication into the request register of the target processor. In step 118, the sending processor determines whether it should wait for an acknowledgment from the target processor or whether it should proceed with processing the remainder of its task. If it is to wait for acknowledgment, the sending processor proceeds to step 120 wherein it loops until acknowledgment has been received; when acknowledgment has been received, the sending processor resets the acknowledgment register space corresponding to the target processor, step 112, and then proceeds to process the remainder of the task, step 106. If, in step 118, the processor is not to wait for an acknowledgment, it proceeds directly to step 106.

The right side of FIG. 6 illustrates the target processor activity according to the present invention. In step 124, the target processor determines whether there has been a request register interrupt. If not, it continues processing, and periodically returns to step 124. If in step 124, a request register interrupt has been detected, the processor proceeds to step 128. At this point, the processor determines whether the request register interrupt should be processed immediately. If not, the processor proceeds to step 130 to continue processing its task, and thereafter periodically returns to step 128. If, in step 128, the processor is ready to process the interrupt, it proceeds to step 132 wherein the request register contents are decoded. When the requet register contents have been decoded in step 132, step 134 is then executed in which the target processor accesses the contents of the communication buffer of the indicated sending processor. The target processor loops through steps 136 and 134 until the information transfer has been complete. Upon completion of the transfer, the target processor, in step 138, writes into the acknowledgment buffer of the sending processor to indicate the transfer of information has been successful. The processor then proceeds to step 140 in which it resets it own request register space, and then to step 126 to continue processing of the task.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:

1. In a computer system wherein N processors, each having a unique identity code, communicate with one another over a system bus and further wherein control of the system bus resides in one of said processors at any point in time, an apparatus for synchronizing communication between said processors, wherein sending processors transfer information to target processors, comprising N bus master control means for controllably coupling the N processors to the system bus, each of which is associated with a different one of said N processors and each of which provides a communications path between the system bus and its associated processor when the associated processor controls the system bus, and each of which removes the communications path between the system bus and its associated processor when the associated processor is not controlling the system bus;

N separate storage means, each of which is coupled to a different one of said N processors and to the system bus independently of the associated bus master control means, for receiving and storing request signals and acknowledgment signals, wherein said request signals are supplied to said storage means associated with a target processor by sending processors which seek to transfer data to the target processor, the request signals comprising a request address including the target processor identity code and request data including the sending processor identity code, and the acknowledgment signals comprising an acknowledgment address including the sending processor identity code and acknowledgment data including the target processor identity code, and further wherein each of the storage means comprise request register means coupled to the system bus and to an associated processor and responsive to the requet signal for storing the request data present in said request signal whenever the identity code of the associated processor is present in the request address of said request signal, wherein each request register means comprise first means for detecting the presence of the identity code of the associated processor in the request address and for generating an write enable signal in response thereto;

a first N-bit register wherein each bit position corresponds uniquely to one of the N processors in the computer system; and first means for evaluating the request data to determine the identity of the sending processor and for setting the bit corresponding to the sending processor in the N-bit register whenever the first detecting means generates the write enable signal; and acknowledgment register means coupled to the system bus and to the associated processor and responsive to the acknowledgment signal for storing the acknowledgment data in said acknowledgment signal whenever the identity code of the associated processor is present in the acknowledgment address of said acknowledgment signal; and N communication buffer means each of which is coupled to a different sending processor and to the system bus independently of the associated bus master control means, for receiving and storing the information sought to be transferred by its associated sending processor, wherein each communication buffer means is coupled to its associated sending processor independently of the system bus, whereby the target processors can access the communication buffer means independently of the sending processor activity and the sending processors can communicate on the system bus independently of the contents of their associated communication buffers, and whereby the target processors can write an acknowledgment signal into the storage means associated with the sending processor to indicate that the information has been successfully transferred.

2. The apparatus of claim 1, wherein each acknowledge register means comprise second means for detecting the presence of the identity code of the associated processor in the acknowledgment address and for generating a write enable signal in response thereto;

a second N-bit register having N bit positions wherein each bit-position corresponds uniquely to one of the N processors in the computer system; and second means for evaluating the acknowledgment data to determine the identity of the target processor and for setting the bit in the N bit register corresponding to the target processor whenever the second detecting means generates the write enable signal.

3. The apparatus of claim 2 wherein each of the plurality of storage means is organized into a plurality of preassigned sections, with each of the sections assigned to store information for one of the N processors so that the target processors only access assigned sections of the storage means.

4. The apparatus of claim 2 wherein the second N bit register and the second evaluating means are collectively a second addressable latch having N addressable cells and further wherein the second addressable latch is address by the acknowledgment data.

5. The apparatus of claim 1 wherein the first N bit register and the first evaluating means are collectively a first addressable latch having N addressable cells and further wherein the first addressable latch is addressed by the request data.

* * * * *